(12) United States Patent
Cheon

(10) Patent No.: US 7,127,601 B2
(45) Date of Patent: Oct. 24, 2006

(54) SYSTEM AND METHOD FOR DELIVERING FPGA PROGRAMMING

(75) Inventor: David Cheon, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 741 days.

(21) Appl. No.: 10/159,232

(22) Filed: May 30, 2002

(65) Prior Publication Data

US 2003/0225942 A1  Dec. 4, 2003

(51) Int. Cl.
G06F 9/00  (2006.01)
G06F 9/24  (2006.01)
G06F 9/44  (2006.01)
G06F 9/445  (2006.01)

(52) U.S. Cl. .............................. 713/2; 713/1; 713/100; 717/168; 717/174

(58) Field of Classification Search ................ None
See application file for complete search history.

(56) References Cited

U.S. PATENT DOCUMENTS

| | | | |
|---|---|---|---|
| 5,185,864 A | | 2/1993 | Bonevento et al. |
| 5,517,498 A | | 5/1996 | Hauris et al. |
| 5,522,086 A | | 5/1996 | Burton et al. |
| 5,559,965 A | | 9/1996 | Oztaskin et al. |
| 5,615,344 A | * | 3/1997 | Corder ..................... 710/62 |
| 6,049,535 A | * | 4/2000 | Ozukturk et al. ........... 370/335 |
| 6,081,511 A | | 6/2000 | Carr et al. |
| 6,157,619 A | * | 12/2000 | Ozluturk et al. ............ 370/252 |
| 6,377,992 B1 | | 4/2002 | Plaza Fernandez et al. |
| 6,418,485 B1 | | 7/2002 | Cooper et al. |
| 6,510,164 B1 | | 1/2003 | Ramaswamy et al. |
| 6,665,739 B1 | | 12/2003 | Vishlitzky et al. |
| 6,735,756 B1 | | 5/2004 | Linn et al. |
| 6,738,829 B1 | | 5/2004 | Wiles et al. |
| 6,810,412 B1 | | 10/2004 | Chang |
| 6,874,147 B1 | | 3/2005 | Diamant |
| 6,885,652 B1 | * | 4/2005 | Ozukturk et al. ........... 370/342 |
| 6,928,478 B1 | | 8/2005 | Gangadharan |
| 2002/0023179 A1 | | 2/2002 | Stanley |
| 2002/0083226 A1 | | 6/2002 | Awasthi et al. |
| 2003/0093430 A1 | | 5/2003 | Mottur |
| 2003/0208652 A1 | | 11/2003 | Kuhlmann et al. |

FOREIGN PATENT DOCUMENTS

GB  2355364 A  4/2001

* cited by examiner

Primary Examiner—James K. Trujillo
(74) Attorney, Agent, or Firm—Park, Vaughan & Fleming LLP

(57) ABSTRACT

A system and method for facilitating delivery of instructions for operating a controller (e.g., an FPGA—Field Programmable Gate Array) of a hardware device (e.g., a network interface circuit) of a computer system. A device driver for the hardware device comprises traditional device driver functionality (e.g., for managing operation of the device at a layer above the physical layer), plus a set of instructions for operating the controller. During attachment of the device driver to the hardware device, or during subsequent hardware initialization of the device, the set of instructions for operating the controller is downloaded to the controller from the device driver.

25 Claims, 4 Drawing Sheets

SYSTEM AND METHOD FOR DELIVERING FPGA PROGRAMMING

BACKGROUND

Related Application

This application is related to U.S. patent application Ser. No. 10/159,233, entitled "Attaching a Device Driver to Multiple Logical Devices of One Physical Device," which was filed May 30, 2002 and issued Sep. 14, 2004 as U.S. Pat. No. 6,792,610.

This invention relates to the field of computer systems. More particularly, a system and methods are provided for delivering FPGA (Field Programmable Gate Array) programming (e.g., an FPGA binary) via a device driver.

Traditionally, a physical communication interface device, such as a Network Interface Circuit (NIC), hosts a single function for a computer system. Therefore, the operating system of the computer only needs to execute a module attachment (or detachment) procedure once for each physical device.

The use of multiple logical or physical communication devices, instead of a single device, can offer gains in communication efficiency. Although attempts have been made to operate multiple physical communication devices on a single computer board or card, it has been unknown to operate multiple logical devices on a single physical communication device in a manner requiring multiple device driver attaches (or detaches). This may be attributed to the inherent need to invoke multiple attach or detach procedures (i.e., once for each logical device), which adds complexity to the initialization of the physical device.

Also, the programming for a hardware device controlled via an FPGA (Field Programmable Gate Array), or other similar component, is often stored on a programmable read-only memory such as an EEPROM (Electrically Erasable Programmable Read Only Memory). The EEPROM contents must be re-flashed whenever the programming changes. The device's firmware may also need to be changed, along with the hardware revision, which may be an expensive process. And, updating the device's programming requires the read-only memory to be re-flashed with the new program logic—a procedure that typically cannot be performed by an average user. This makes it difficult to keep hardware devices' programming up-to-date.

SUMMARY

In one embodiment of the invention, a system and methods are provided for delivering programming logic (e.g., an FPGA binary) to a physical device of a computer system via a device driver for the device. The device driver may be loaded in a normal fashion, by the computer's operating system, to facilitate operation of the device.

In this embodiment, the programming code (e.g., an FPGA binary file) for the physical device is converted into a source file for a selected programming language (e.g., C). The source file includes the contents of the binary file in a suitable data structure (e.g., an array of bytes). The source file is compiled to generate an object file, which is then linked with a device driver object file to form a device driver loadable module. When the device driver is loaded by the operating system and attached for the physical device, the physical device is initialized. At that time the device's programming is loaded onto the device (e.g., an FPGA or controller component of the device).

In another embodiment of the invention, a system and methods are provided for handling a device driver attachment or detachment request to attach or detach a physical device (e.g., a NIC) having multiple logical devices.

In this embodiment, each logical device is separately attached (e.g., for interrupt registration purposes), thereby requiring the attachment function to be invoked multiple times. The physical device is initialized only after all logical devices have been attached.

During the attachment of each logical device, an identifier (e.g., a MAC identifier) of the physical device may be read from the physical device. If one does not exist, thereby indicating that the logical device was the first one attached, a device soft state structure is allocated and initialized.

For each attached logical device, a counter is incremented to note the number of logical devices attached to the physical device. And, a device information pointer (dip) and instance identifier assigned to the logical device during attachment are recorded into a soft state data structure maintained by the device driver. Although the device driver may maintain multiple dips (e.g., one for each logical device), the device driver may use just one to operate the physical device.

A selected device information pointer (e.g., for a logical device having a predetermined name) may be used in one or more DDI (Device Dependent Interface) functions invoked after all logical devices have been attached.

During detachment of a logical device, a counter is kept of the number of logical devices detached from a given physical device. When all logical devices have been detached, allocated resources may be released, and the physical device may be reset.

DETAILED DESCRIPTION

Figure 1:
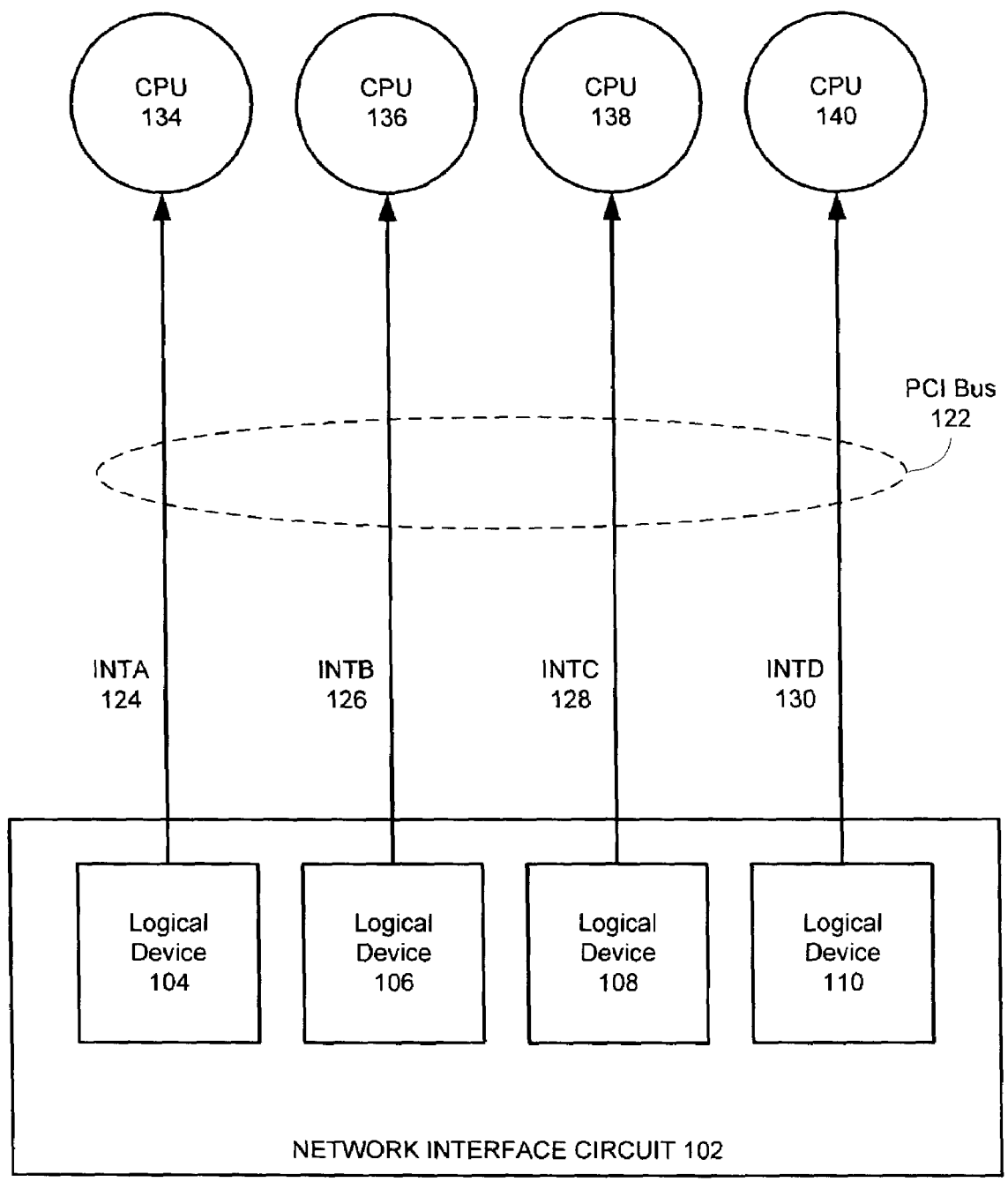
FIG. 1 is a block diagram of a network interface device hosting multiple logical devices, according to an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Attaching a Device Driver to Multiple Logical Devices on One Physical Device

In one embodiment of the invention, a system and method are provided for attaching a communication device driver to (or detaching the device driver from) multiple logical devices defined on a single physical communication device. This embodiment may be implemented, for example, to facilitate operation of multiple PCI (Peripheral Component Interconnect) functions or sub-functions on a physical Network Interface Circuit (NIC) board or card (e.g., a PCI card).

In an embodiment of the invention, a network node is a multiprocessor computer operating the Solaris operating system. Further, the node may include multiple PCI NICs. For example, in an SRP (Spatial Reuse Protocol) network the node may employ two separate NICs to enable full use of the dual, counter-rotating ring network. In a PPP (Point-to-Point Protocol) network, a node may include one or more NICs.

In this illustrative embodiment, each NIC in the network node is a PCI device configured for up to four logical devices. The use of multiple logical devices can enable substantial communication efficiencies. In particular, the number of logical devices can exactly correspond to the number of interrupt lines in the NIC's PCI configuration space and the number of computer processors for managing communications handled by the logical devices. Thus, each logical device may be registered with a different interrupt line, and each interrupt line can be serviced by a different processor.

FIG. 1 illustrates a physical communication device hosting multiple logical devices, according to one embodiment of the invention. NIC 102 is a full-size PCI board capable of hosting up to four logical devices 104, 106, 108, 110. Among its components, PCI bus 122 provides interrupt lines 124, 126, 128, 130 for signalling interrupts between the logical devices and processors 134, 136, 138, 140.

In the embodiment of FIG. 1, the four logical devices may participate in a single IP (Internet Protocol) communication stream and share a single IP address (where the network layer protocol is IP). Each logical device may, however, host a different Transport Control Protocol (TCP)/IP connection and/or application (e.g., http, NFS (Network File System), FTP (File Transport Protocol), OLTP (Online Transaction Protocol)), and may therefore be associated with a different TCP port.

Because there are four separate logical devices in the embodiment of FIG. 1, the operating system of the host node will invoke an "attach" procedure four times, to attach a device driver to each device. For example, in the Solaris operating system, the Solaris kernel will recognize four devices in the PCI configuration space of NIC 102, and invoke the driver attachment function (a function identified by *devo_attach) of the device operations structure (dev_ops) for each logical device. Similarly, when detaching the device driver from the logical devices, the Solaris kernel will call the detachment function (identified by *devo_detach) four times.

Because the attach (or detach) function is performed multiple times for a single physical device in an embodiment of the invention, the system will track the progress of the attachment (or detachment) operations. In particular, because the hardware (e.g., NIC) that hosts multiple logical devices may only be initialized after the device driver attachments have completed, there needs to be some way of determining when each logical device has been attached. An operating system may not perform the attachments in a predictable sequence (e.g., particularly when the node includes multiple physical devices), thereby making the procedure more complex.

Figure 2:
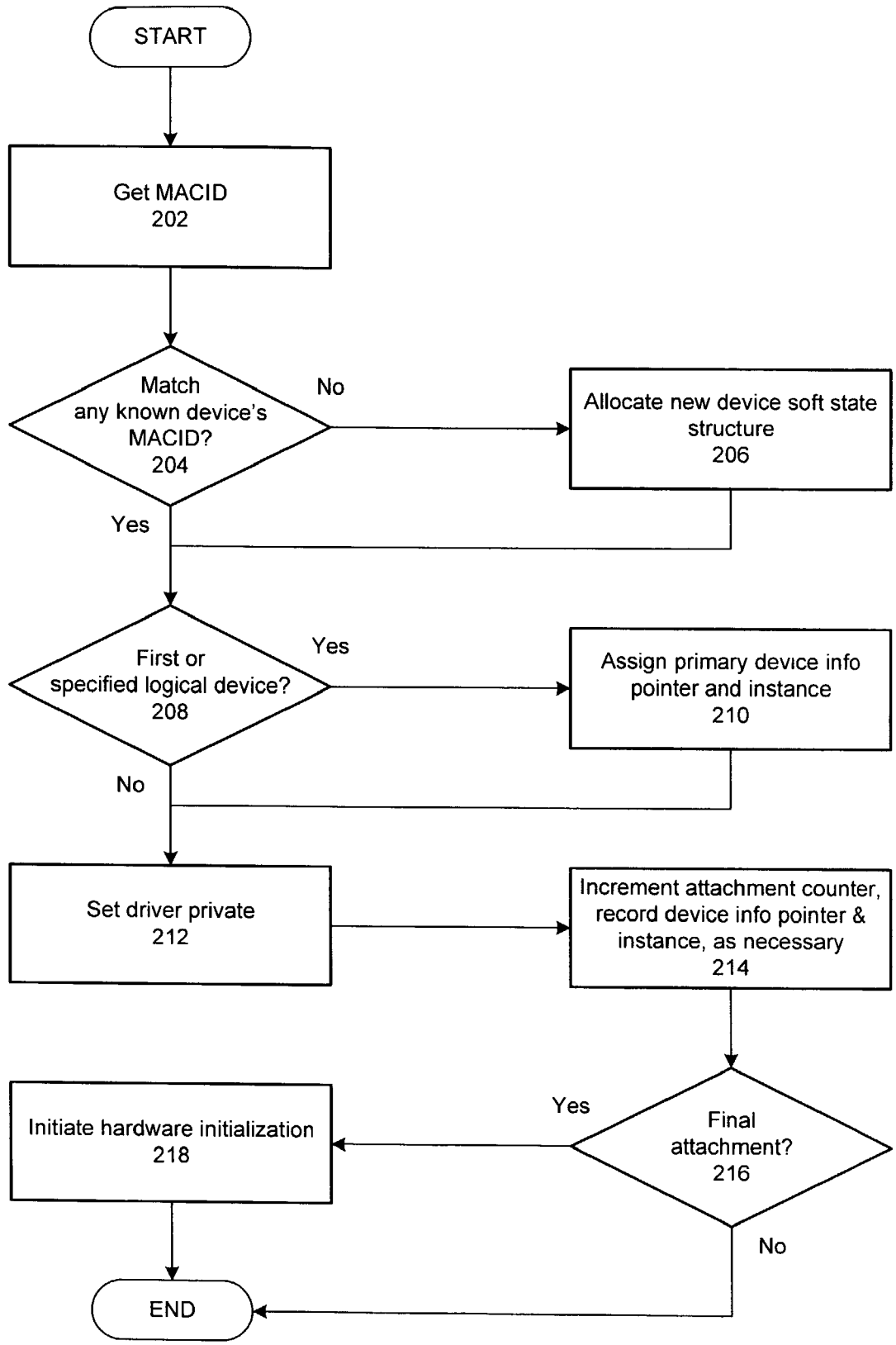
FIG. 2 is a flowchart illustrating one method of facilitating the attachment of multiple logical devices for a single physical communication interface device, according to an embodiment of the invention.

FIG. 2 demonstrates a procedure for performing device driver attachments for multiple logical devices of a single physical device, according to one embodiment of the invention. In this embodiment, the operating system used by the computer system is Solaris, and one single device driver (corresponding to the physical device) is attached to each logical device of the physical device. In an alternative embodiment, multiple device drivers may be used.

In state 202, the operating system recognizes a logic device and initiates its "attach" procedure for that device. Therefore, the MAC-ID (Medium Access Control identifier), or MAC address, of the physical device on which the logical device is located is obtained (e.g., by reading it from a device PROM).

In state 204, the current MAC-ID (of the physical device) is compared to the MAC-IDs of any known physical devices. In particular, in one embodiment of the invention, the device driver constructs a separate device soft state structure for each physical device, and the structures (if there are more than one) are linked together (e.g., via pointers or other references). Each device soft state structure contains various information or statuses of the corresponding physical device, including the MAC-ID. Thus, the linked structures can be traversed and searched for a MAC-ID matching the current MAC-ID. If a match is found, the illustrated method advances to state 208.

Otherwise, in state 206, this is the first attachment for the current physical device. Therefore, a new device soft state structure is allocated and initialized for the device, and its MAC-ID is set to the current MAC-ID. Also, the device driver may initialize a few bookkeeping values described shortly (e.g., to count the number of attachments, record the logical devices' device information pointers and record instance identifiers assigned to the logical devices).

In state 208, a determination is made as to whether the current attachment is attaching a logical device having a specified node name or binding name. For example, if the node names of the four logical devices in FIG. 1 were a11, a12, a13 and a14, state 208 may involve the determination of whether node a11 is being attached. If not, the procedure continues at state 212.

Otherwise, in state 210, the device information pointer (dip) assigned to a logical device having a specified node name is assigned as the primary_dip for the physical device. A dip is assigned to each logical device, by the operating system, during the attach function. Illustratively, the primary dip is saved for use as a parameter for identifying the physical device when invoking a DDI function (e.g., during initialization of the physical device after all of the logical device attachments).

In an embodiment of the invention, the DDI functions that are invoked once for each physical device, after the device driver has been attached to all logical devices, may include any or all of the following: pci_config_setup, ddi_regs_map_setup, ddi_get_iblock_cookie, ddi_ptob, ddi_dma_alloc_handle, ddi_prop_create and ddi_prop_remove_all. Other functions may be invoked for each logical device and may therefore require the individual device soft state pointers assigned to each logical device. These functions include any or all of the following: ips_add_softintr, ddi_create_minor_node, ddi_remove_minor_node, ddi_report_dev, ddi_remove_intr and ddi_set_driver_private. Some of functions identified herein may be used in conjunction with device driver detach operations rather than attach operations.

Also, the instance identifier assigned to the specified logical device may be recorded for use (e.g., as primary_instance) when plumbing the protocol stack for the device driver. Illustratively, an instance identifier is assigned by the operating system to each logical device during execution of the attach function. In an alternative embodiment, any of the device information pointers or instance identifiers may be used as the "primary" (i.e., not necessarily the identifier of the specified or first device).

In state 212, the DDI interface (e.g., ddi_set_driver_private) is invoked to associate the dip assigned to the current logical device with the device soft state structure of the physical device. Thus, the device information pointers for all the logical devices of one physical device will be associated with the physical device's device soft state structure. In particular, the address of the physical device's device information pointer may be recorded in each logical device's device information pointer.

In state 214, an attachment counter is incremented for the current physical device, in order to determine when the device driver has been attached to the last (e.g., fourth) logical device. In addition, the instance identifier and device information pointer may be recorded (e.g., in arrays).

In state 216, the device driver determines whether this attachment function was for the final (e.g., fourth) logical device. This determination may be aided by reference to an attachment counter described above. If this was not the final attachment, the illustrated method ends or repeats with the attachment of the next logical device.

Otherwise, in state 218, after the final attachment, initialization of the hardware (the physical device) can be initiated, along with allocation of resources and registration of interrupts, to complete the attach sequence.

After state 218, the procedure ends.

Illustratively, the method of FIG. 2 may be applied by a device driver associated with the physical device. The actual attachment of a logical device may be performed by the kernel (e.g., by invoking the device driver's attach function).

Figure 3:
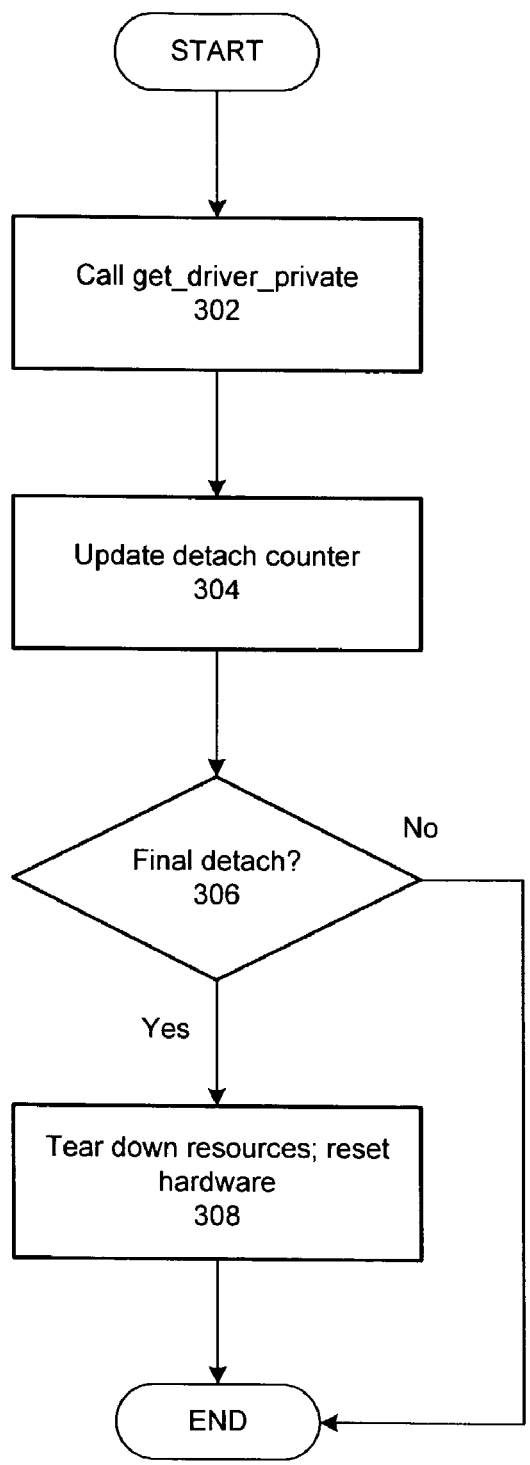
FIG. 3 is a flowchart illustrating one method of facilitating the detachment of multiple logical devices for a single physical communication interface device, according to an embodiment of the present invention.

FIG. 3 demonstrates a procedure for detaching logical devices of a physical communication device, according to one embodiment of the invention.

In state 302, the operating system invokes the detach function for an attached logical device. Using the device information pointer (dip) of that logical device, the device soft state structure of the physical device is located by invoking get_driver_private, using the dip as a parameter. Illustratively, the kernel tracks the dip associated with each logical device and provides it to the device driver when invoking the detach function.

In state 304, a detach counter associated with the physical device is updated to indicate that another logical device has been detached.

Based on the detach counter (or some other indicator), in state 306 a determination is made as to whether all (e.g., four) logical devices have been detached. If not, the illustrated procedure ends, to await detachment of another logical device.

Otherwise, in state 308, all logical devices have been detached. Therefore, the device driver tears down resources allocated to the physical/logical devices (e.g., the device soft state structure, device information pointers) and resets the physical device.

Illustratively, the method of FIG. 3 may be performed by the device driver associated with the physical device, in response to a detachment request from the kernel.

Delivering Hardware Programming Via a Device Driver

In one embodiment of the invention, logic for operating an FPGA (Field Programmable Gate Array), or a similar component configured to control a hardware device (e.g., a network interface circuit), is delivered to the FPGA via a device driver.

In this embodiment, the FPGA logic is merged with device driver logic in a device driver file. When the operating system (of the computer system in which the hardware device is installed) loads the device driver and attaches it to the device, as part of the hardware initialization process the device driver downloads the FPGA logic to the FPGA. The FPGA logic may be configured as a data array within the device driver file.

Figure 4:
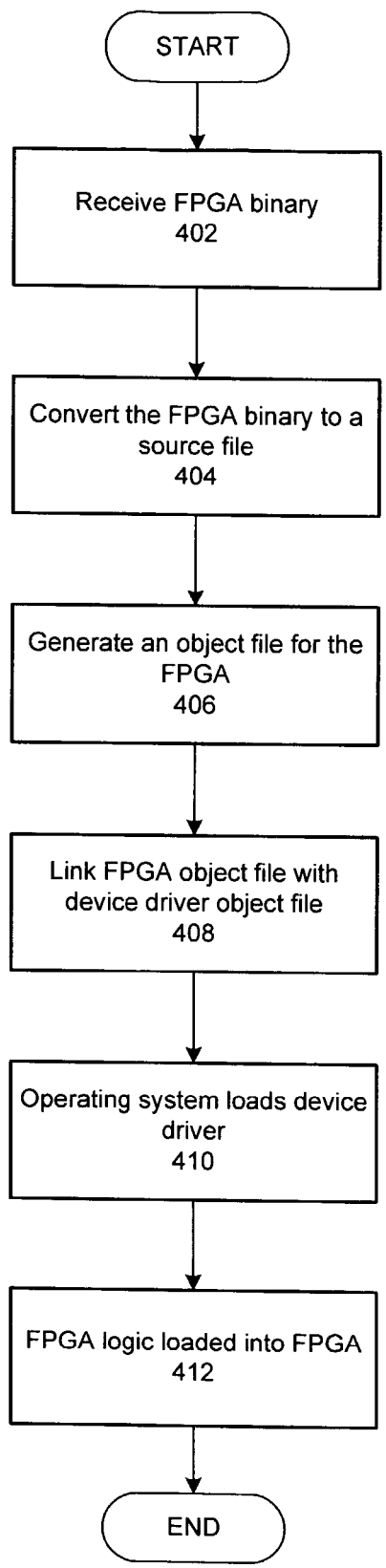
FIG. 4 is a flowchart demonstrating one method of delivering a hardware device's programming via a device driver, according to an embodiment of the invention.

FIG. 4 demonstrates a method of using a device driver file to deliver a hardware device's operating logic, according to one embodiment of the invention. In this embodiment, the hardware device is a network interface device (e.g., a NIC), and the logic is executed by an FPGA. Other embodiments of the invention may be derived from the following description.

In state 402, the source or raw FPGA binary for controlling the physical operation of the network interface device is received or accessed. For example, an FPGA binary file may be provided by a vendor of the hardware device that includes the FPGA.

In state 404, the FPGA binary is converted into a text file or other file suitable for compilation. For example, the FPGA binary content may be structured as an array of bytes, or other suitable data structure, within a ".c" file, for compilation by a C compiler.

In state 406, the source file is compiled to produce an object file containing the FPGA binary data.

In state 408, the FPGA object file is linked with a device driver object file. The two object files are combined to form a loadable module recognizable to a computer operating system.

In state 410, the operating system loads the device driver module as part of its initialization of the network interface device. A part of the initialization, the device driver may be attached to the network interface device, or one or more logical devices defined on the network interface device.

In state 412, the hardware initialization of the network device is initiated (e.g., by the device driver) and the device driver loads the FPGA data into the FPGA. Illustratively, the device driver may post the FPGA data, including the new FPGA binary, into static RAM and invoke the embedded firmware to load the FPGA binary and program it into the FPGA. When the hardware completes initialization, the network interface device then operates according to the code downloaded into the FPGA.

The foregoing descriptions of embodiments of the invention have been presented for purposes of illustration and description only. They are not intended to be exhaustive or to limit the invention to the forms disclosed; the scope of the invention is defined by the appended claims.

What is claimed is:

1. A method of delivering operating logic for operating a controller component of a communication device, to the controller component, the method comprising:
    receiving the operating logic;
    embedding the operating logic within a device driver of the communication device, wherein the device driver is separate from the operating logic prior to said embedding;
    facilitating loading of the operating logic from the device driver to the controller component;
    receiving an identifier of the communication device;
    initializing a device soft state structure for the communication device if a device soft state structure does not already exist for the communication device;
    receiving a first device information pointer assigned to a first logical device attached for the communication device;
    receiving a first instance identifier of the first attached logical device;
    associating the first device information pointer with the device soft state structure;
    incrementing a count of the number of logical devices that have been attached for the communication device; and
    initializing the communication device after all of the multiple logical devices have been attached.

2. The method of claim 1, wherein said receiving comprises:
    receiving the operating logic from a provider of the communication device as a set of binary data.

3. The method of claim 2, wherein said embedding comprises:
    linking the set of data with the device driver.

4. The method of claim 1, wherein said embedding comprises:
    configuring the operating logic as a collection of data within a source file; and
    compiling the source file to produce a first object file.

5. The method of claim 4, wherein said embedding further comprises:
    linking the first object file with an object file of the device driver to produce a device driver conforming to an operating system loadable format.

6. The method of claim 5, wherein said facilitating loading comprises:
    providing the device driver for loading by a computer operating system.

7. The method of claim 1, wherein said facilitating loading comprises:
    attaching the device driver to the communication device; and
    initiating hardware initialization of the communication device.

8. The method of claim 7, wherein during said hardware initialization, the operating logic is loaded to the controller component.

9. The method of claim 1, wherein said facilitating loading comprises:
    executing the device driver on a host computer comprising the communication device; and
    during said executing, loading the operating logic to the controller component from the device driver.

10. The method of claim 1, wherein the controller component is a Field Programmable Gate Array.

11. The method of claim 1, wherein the controller component is a programmable logic chip.

12. The method of claim 1, wherein the communication device is a network interface circuit.

13. The method of claim 1, wherein the device driver is configured to be attached to multiple logical devices defined on the communication device.

14. A method of delivering, to a controller component of a communication device, operating logic for operating the controller component, the method comprising:
    receiving the operating logic;
    embedding the operating logic within a device driver of the communication device, wherein the device driver is separate from the operating logic prior to said embedding;
    facilitating loading of the operating logic from the device driver to the controller component;
    for each of multiple logical devices to be attached to the communication device:
        incrementing a counter of the number of logical devices attached;
        noting a device information pointer assigned to said attached logical device; and
        recording an instance identifier assigned to said attached logical device; and
    after attachment of all of the multiple logical devices for the communication device, initializing the communication device.

15. The method of claim 14, wherein said receiving comprises:
    receiving the operating logic from a provider of the communication device as a set of binary data.

16. The method of claim 15, wherein said embedding comprises:
    linking the set of data with the device driver.

17. The method of claim 14, wherein said embedding comprises:
    configuring the operating logic as a collection of data within a source file; and
    compiling the source file to produce a first object file.

18. The method of claim 17, wherein said embedding further comprises:
    linking the first object file with an object file of the device driver to produce a device driver conforming to an operating system loadable format.

19. The method of claim 18, wherein said facilitating loading comprises:
    providing the device driver for loading by a computer operating system.

20. The method of claim 14, wherein said facilitating loading comprises:
    attaching the device driver to the communication device; and
    initiating hardware initialization of the communication device.

21. The method of claim 20, wherein during said hardware initialization, the operating logic is loaded to the controller component.

22. The method of claim 14, wherein said facilitating loading comprises:
   executing the device driver on a host computer comprising the communication device; and
   during said executing, loading the operating logic to the controller component from the device driver.

23. The method of claim 14, wherein the controller component is a Field Programmable Gate Array.

24. The method of claim 14, wherein the controller component is a programmable logic chip.

25. The method of claim 14, wherein the communication device is a network interface circuit.

* * * * *